(12) United States Patent
Jamison

(10) Patent No.: US 8,707,605 B2
(45) Date of Patent: Apr. 29, 2014

(54) FLEXIBLE FASTENERS FOR USE IN RIFLE CONSTRUCTION

(76) Inventor: John R. Jamison, Springfield, OR (US)

(*) Notice: Subject to any disclaimer, the term of this patent is extended or adjusted under 35 U.S.C. 154(b) by 1230 days.

(21) Appl. No.: 12/082,187

(22) Filed: Apr. 9, 2008

(65) Prior Publication Data

US 2010/0319232 A1    Dec. 23, 2010

(51) Int. Cl.
*F41C 23/18* (2006.01)
*F41A 3/64* (2006.01)

(52) U.S. Cl.
CPC .................................. *F41A 3/64* (2013.01)
USPC ............................................. 42/75.03

(58) Field of Classification Search
CPC ........................................................ F41A 3/64
USPC ........................................ 42/75.01, 75.03, 77
See application file for complete search history.

(56) References Cited

U.S. PATENT DOCUMENTS

| | | | | |
|---|---|---|---|---|
| 36,014 A | * | 7/1862 | Meissner | 411/392 |
| 1,201,944 A | | 10/1916 | Dodds | |
| 1,469,126 A | * | 9/1923 | Thomas | 411/338 |
| 1,828,287 A | * | 10/1931 | MacBean | 470/11 |
| 2,324,775 A | | 7/1943 | Hentschel | |
| 2,339,331 A | * | 1/1944 | Grigg | 42/75.01 |
| 2,867,931 A | | 1/1959 | Schreiber | |
| 3,206,885 A | | 9/1965 | Dye | |
| 3,763,855 A | | 10/1973 | McAtee | |
| 3,830,003 A | | 8/1974 | Clerke | |
| 4,312,146 A | | 1/1982 | Koon, Jr. | |
| 4,385,464 A | * | 5/1983 | Casull | 42/75.03 |
| 4,473,964 A | | 10/1984 | Straub et al. | |
| 5,061,137 A | * | 10/1991 | Gourd | 411/510 |
| 5,797,234 A | * | 8/1998 | Theodorou | 52/578 |
| 6,637,142 B1 | | 10/2003 | Reynolds | |
| 6,955,513 B2 | | 10/2005 | Niku | |
| 2004/0243129 A1 | | 12/2004 | Moumene et al. | |
| 2005/0177167 A1 | | 8/2005 | Muckter | |

* cited by examiner

*Primary Examiner* — Michael Carone
*Assistant Examiner* — Reginald Tillman, Jr.
(74) *Attorney, Agent, or Firm* — Chernoff, Vilhauer, McClung & Stenzel, LLP

(57) ABSTRACT

A rifle construction includes an action and barrel that seat within a stock. The action is fastened to the stock with flexible fasteners that allow the action to seat properly and maintain alignment in the presence of recoil forces or other forces acting on the fasteners. The fasteners can thus compensate for forces created by misalignment during assembly, temperature changes and/or recoil without adversely affecting the zero of the firearm.

12 Claims, 1 Drawing Sheet

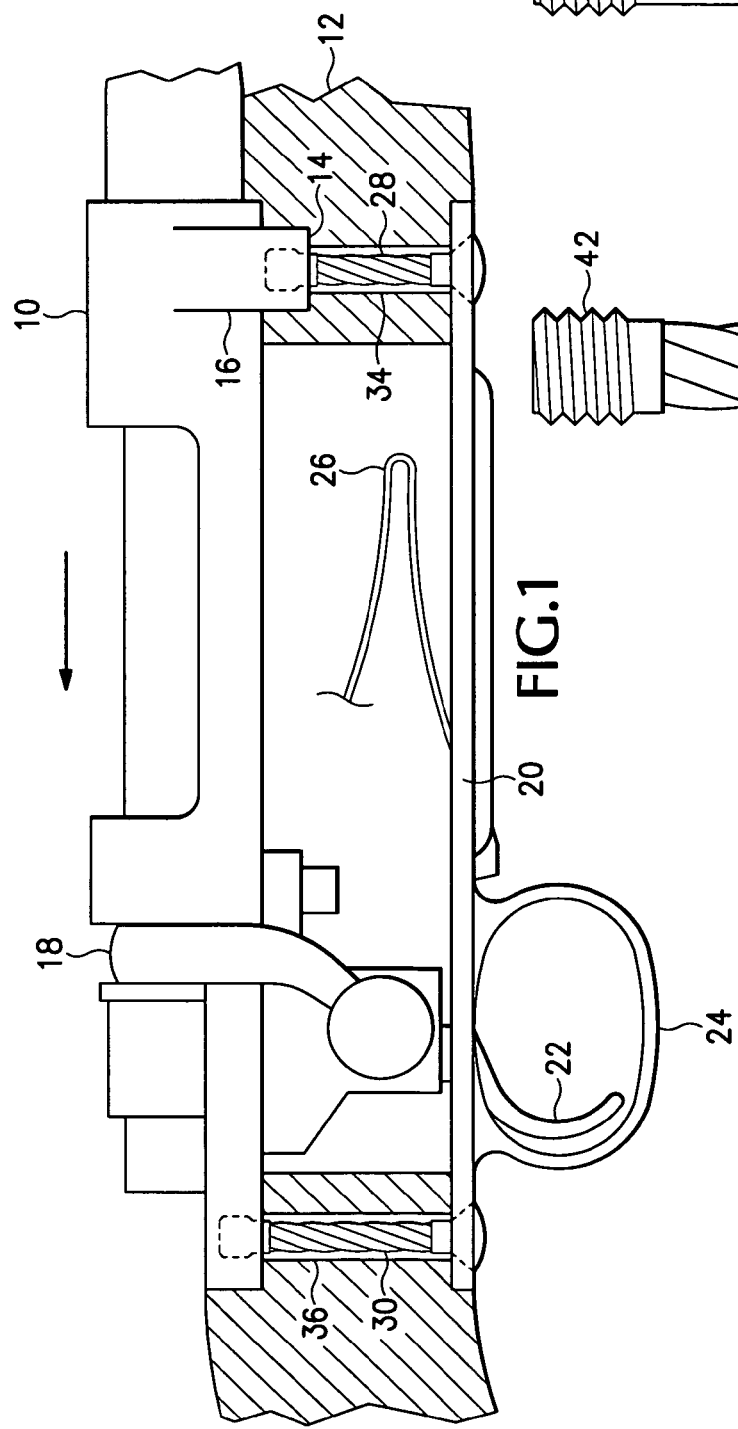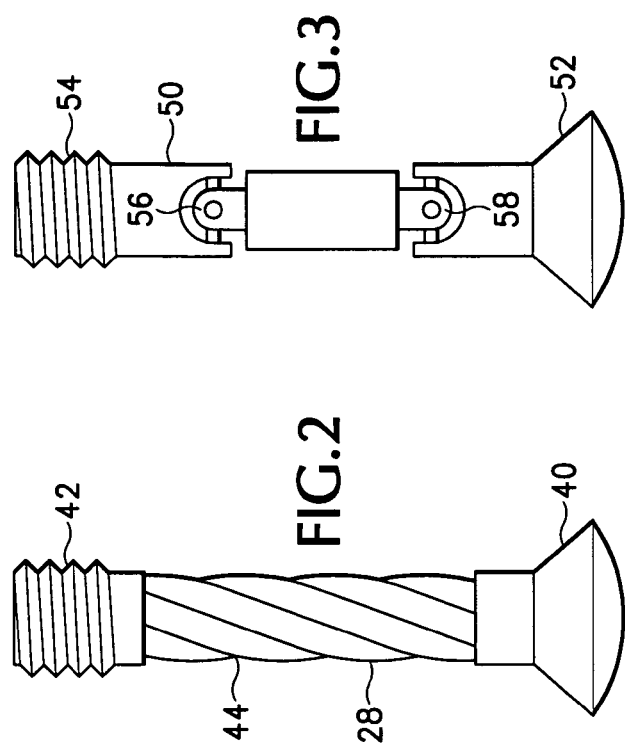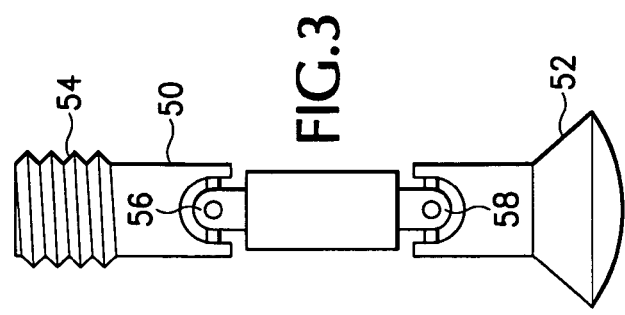

FLEXIBLE FASTENERS FOR USE IN RIFLE CONSTRUCTION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Field of the Invention

Firearms, including rifles, have a barrel and an action that are coupled to a stock. The action is joined to the stock with screws that extend through the stock material and into holes in the action. The screws may also extend through a trigger guard plate so that when the three pieces are assembled the trigger guard plate or floor plate and the action sandwich the stock material in the middle. The action lies in a cutout portion of the stock. Typically, the action includes a recoil lug, which is a solid rectangular flange that fits within a slot that is cut into the stock material. When the action is dropped or pressed into the stock, the recoil lug seats in its slot and the pieces are held together by tension exerted from the screws as they are turned into the holes in the action. If there is any misalignment of the holes in the action, stock and/or floor plate, undesirable forces set up which are exerted on the fastener and, in turn, the action.

Typically, such fasteners are solid screws made of steel or some other solid, metallic material. The rigidity of these fasteners combined with stresses they may exert on the barreled action can lead to accuracy problems. First, unless the action is seated perfectly, tightening the screws can set up undesirable forces and moments in the action/stock interface. Such adverse forces tend to cause the barreled action to shift or alter the action/stock relationship from shot to shot during firing. These sometimes-imperceptible shifts in the action/stock relationship cause greatly magnified shifts in bullet dispersion on target down-range. Recoil forces act in a direction perpendicular and usually above the shafts of the screws. Thus, it is difficult for the screws to hold the action and the stock together in a preferred alignment in the presence of such forces. Even small amounts of binding or cocking can have a negative effect on the accuracy of the firearm.

BRIEF SUMMARY OF THE INVENTION

A rifle construction includes an action and barrel that seat within a stock. The action is fastened to the stock with fasteners that may flex in the presence of recoil forces or misalignment during manufacture and thus allow the action to seat properly and avoid cocking or binding.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a partial side cutaway view of a firearm including an action and a stock and employing flexible fastening devices to couple the action to the stock.

FIG. 2 is a side view of first type of flexible fastener.

FIG. 3 is a side view of a second type of flexible fastener.

DETAILED DESCRIPTION OF PREFERRED EMBODIMENT

A rifle construction as shown in FIG. 1 provides a way of coupling a standard action to a stock in a way that permits the action to seat properly without binding and without cocking. Further, recoil forces generated when the firearm is discharged do not throw the firearm out of alignment. Thus, a firearm that has been zeroed will remain in that condition because recoil forces will not affect the mechanical connection between the action and the stock, which sometimes happens with more conventional firearm constructions.

Referring to FIG. 1, an action 10 is seated within a stock 12. The stock 12 includes a slot 14, which accepts a recoil lug 16. Recoil forces are generally absorbed by the slot 14 that houses the recoil lug 16. Thus, there is always some movement in response to the recoil forces, which is generally in the direction of the arrow at the top of FIG. 1.

The action shown is a bolt-action type and, as such, includes a bolt 18. A trigger 22 extends through an opening (not shown) in the stock and is protected by a trigger guard 24. A second opening (also not shown) provides for the insertion of a magazine (not shown), which may be held in place by a floor plate 20. Other types of actions such as single shot, lever, semiautomatic or slide may be used as well.

The action 10 is coupled to the stock by a pair of fasteners 28 and 30. The fasteners 28 and 30 extend through holes in a floor plate or trigger guard plate 20, through respective holes 34, 36 in the stock, and into holes drilled in the action, which are adapted to accept threaded members.

Referring to FIG. 2, the fasteners are screw-type fasteners and, as such, include a head 40 and a threaded distal end 42. A shank 44 is adapted to flex along its longitudinal axis, that is, the distal end 42 can move relative to the head 40 in all directions. Thus, the shank 44 can flex in a direction that is substantially parallel to the direction of recoil forces as indicated by the arrow in FIG. 1 as well as in other directions. The shank 44 of the fastener 28 can also flex in response to forces that are set up within the interface between the action 10 and the stock 12, whether caused by recoil, by initial seating of the action with respect to the stock, or by expansion and contraction of materials in response to temperature changes. It will be appreciated that the shank can flex in any direction along its axis, which allows for less than precise seating of the action to the stock and the floor plate without any adverse effect on the zero of the firearm.

Referring to FIG. 3, a second type of fastener 50 includes a head 52 and a distal threaded end 54. The shank of fastener 50 is made of a solid material but includes U-joints 56 and 58, which permit omnidirectional flexing.

The fasteners 28 and 30 are aligned so as to lie approximately along a line parallel to the bore axis of the barrel of the firearm. This means that all recoil forces will be acting substantially perpendicular to the fasteners 28 and 30 without setting up any extraneous angular moments because the fasteners have shanks that will flex in response to recoil forces. This is ideal; however, even if alignment is not perfect, the fact that the fasteners may flex avoids inaccuracies that would otherwise set up in the action/stock interface as is the case with rigid, nonbendable fasteners.

The stock 12 has holes 34 and 36 to permit passage of the fasteners from the trigger guard plate 20 into the action 10. The holes 34 and 36 are made so as to be oversized with respect to the respective diameters of the shanks of the fasteners 28 and 30. In this way, the fasteners 28 and 30 can flex within these holes in response to forces generated by recoil or otherwise without bearing against the stock material and causing the action to become skewed with respect to the stock or be thrown out of alignment.

The shank 44 of the fastener 28 is constructed from a bundle of wires wound in a helical fashion and the bundle is constrained at either end by the head 40 and the distal end 42 respectively. Such a construction is sometimes referred to as "wire rope" and consists of filaments of metal wire wound about an axis. Other types of constructions may be used for the shank portion of the fasteners 28 and 30 and the invention is not limited to the two types of construction shown in FIGS. 2 and 3. Any type of strong yet flexible material that permits the flexing of the shank in response to forces generated in directions generally perpendicular to the shank will work for the purposes described above.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A firearm construction comprising:
   a) an action and a barrel;
   b) a stock; and
   c) at least one fastener member for joining the action to the stock, the fastener member have a head, a shank portion and a distal end wherein the shank portion is constructed of a yieldable material adapted to flex in multiple directions normal to the shank when said stock is connected to said action and to remain in a flexed condition without imparting substantial forces or moments at the interface between the stock and the action.

2. The firearm construction of claim 1 wherein said shank is constructed of a bundle of flexible wires.

3. The firearm construction of claim 1 including at least a pair of said fastener members, the positions of said fastener members being aligned generally with said barrel.

4. The firearm construction of claim 3 further including a trigger mechanism wherein said one of said fastener members is situated forward of said trigger mechanism and a second one of said fastener members is situated rearwardly of said trigger mechanism.

5. The firearm construction of claim 4 wherein said shank portions of said fastener members are constructed of a bundle of flexible wires.

6. The firearm construction of claim 1 wherein said fastener members each have an axial diameter and wherein said stock and said action have holes for receiving said fastener members, said holes having diameters that are oversized relative to said diameters of said fastener members to allow flexing movements of said fastener members therein.

7. A firearm construction comprising
   a) an action and a barrel
   b) a stock
   c) at least a pair of fastener members for joining the action to the stock, the fastener members having a head, a shank portion and a distal end wherein the shank portion is constructed so as to permit the shank to flex in multiple directions normal to the shank when said stock is connected to said action and to remain in a flexed condition without imparting substantial forces or moments at the interface between the stock and the action.

8. The firearm construction of claim 7 wherein said fastener members each have a shank made of a wire bundle.

9. The firearm construction of claim 7 wherein each fastener member has a shank made of a bendable material which flexes in response to forces acting in directions normal to said shank.

10. The firearm of claim 9 further including a trigger wherein said at least pair of fastener members are disposed such that one fastener member is forward of the trigger and another fastener member is rearward of the trigger.

11. The firearm construction of claim 7 wherein said fastener members each have an axial diameter and wherein said stock and said action have holes for receiving said fastener members, said holes having diameters that are oversized relative to said diameters of said fastener members to allow flexing movements of said fastener members therein.

12. The firearm construction of claim 7 wherein said shank portion includes a flexible U-joint.

* * * * *